No. 634,538. Patented Oct. 10, 1899.
J. F. McELROY.
THERMOSTATIC TRAP.
(Application filed July 9, 1898.)
(No Model.) 2 Sheets—Sheet 1.

Witnesses
A. A. McHaig
J. M. Erwin

Inventor
James F. McElroy,
Waid & Cameron
By Attys

THE NORRIS PETERS CO., PHOTO-LITHO., WASHINGTON, D. C.

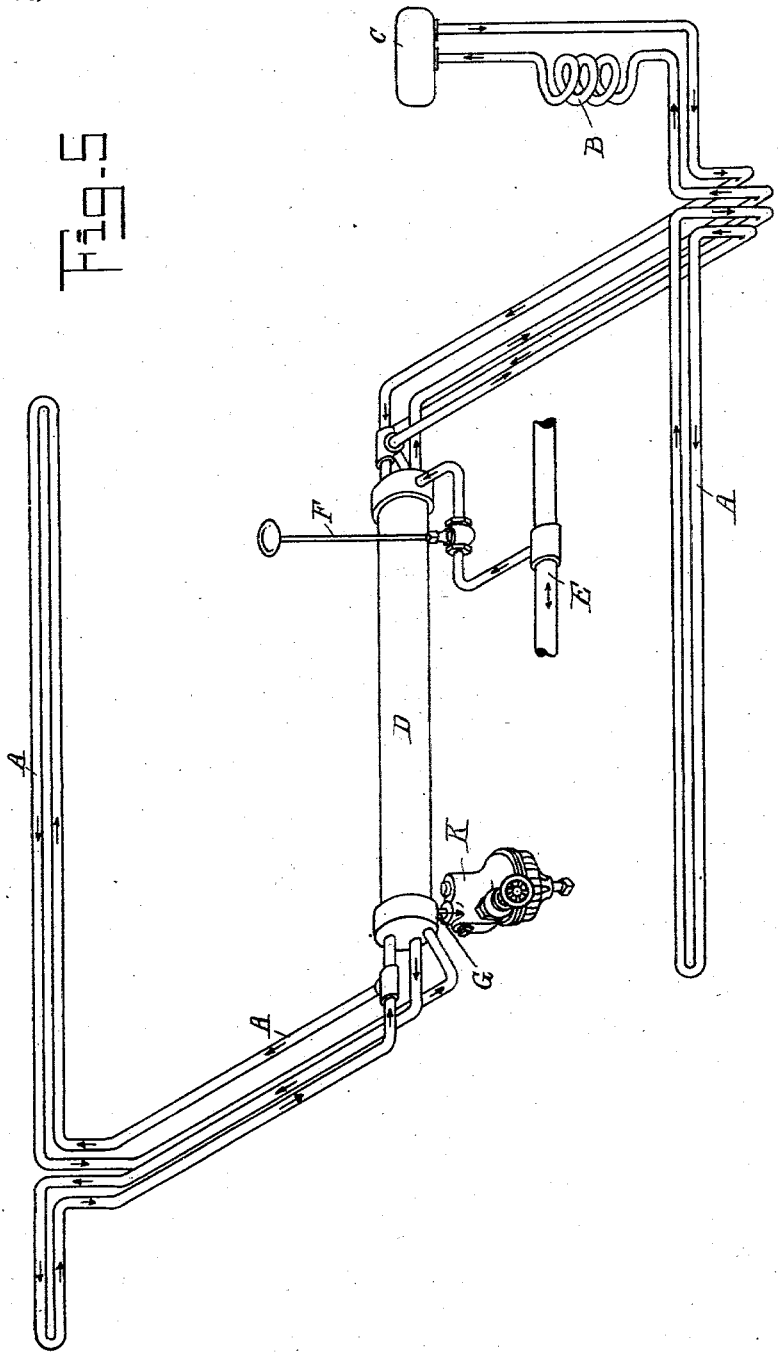

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

THERMOSTATIC TRAP.

SPECIFICATION forming part of Letters Patent No. 634,538, dated October 10, 1899.

Application filed July 9, 1898. Serial No. 685,483. (No model.)

*To all whom it may concern:*

Be it known that I, JAMES F. MCELROY, a citizen of the United States of America, and a resident of Albany, in the county of Albany and State of New York, have invented certain new and useful Improvements in Thermostatic Traps, of which the following is a specification.

My invention relates to traps for railway-car-heating systems; and the object of my invention is to provide a thermostatic trap so arranged and connected up that each portion of the trap shall be kept above the freezing-point when either of the portions thereof is above the freezing-point and which will automatically check the discharge from the heating system when hot water or steam is emitted therefrom. I attain this object by means of the mechanism illustrated in the accompanying drawings, in which—

Figure 1:
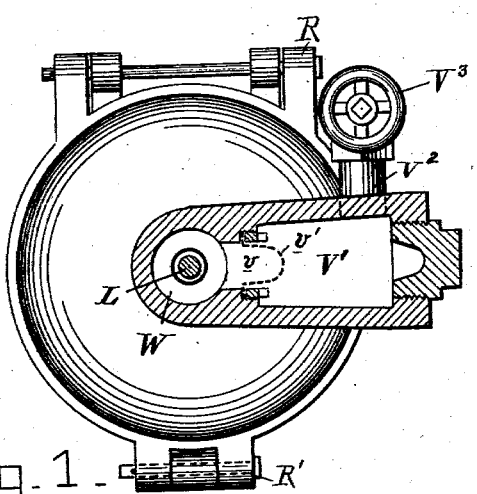
Figure 2:
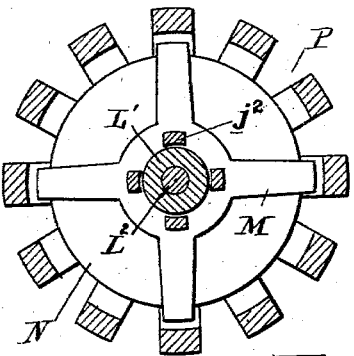
Figure 3:
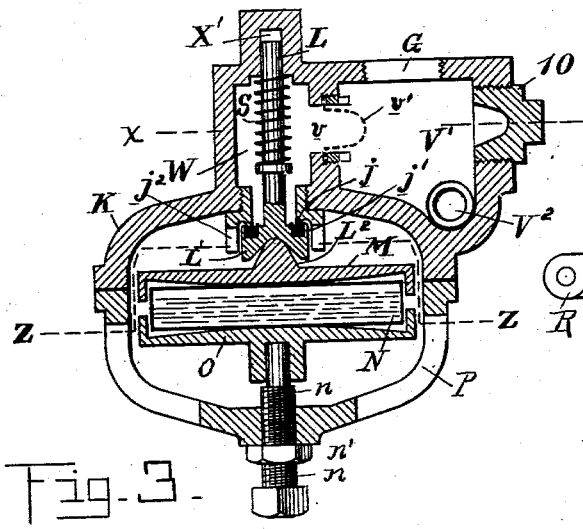
Figure 4:
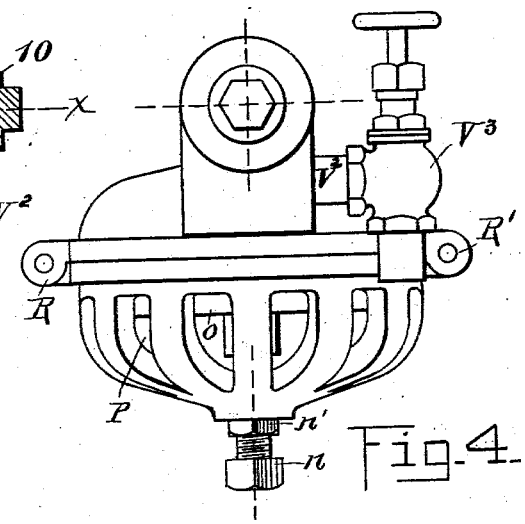

Figure 1 is a plan along the lines $x\,x$ on Fig. 3. Fig. 2 is a section along the lines $z\,z$ on Fig. 3. Fig. 3 is a vertical section. Fig. 4 is an elevation, and Fig. 5 is a perspective view of the piping of a water-circulating system.

Similar characters refer to similar parts throughout the several views.

A represents the water-circulating pipes; B, the coil of a water-heater; C, the expansion-drum; D, a steam-heated drum usually arranged beneath the floor of the car.

E is a train-pipe carrying steam to the drum D.

F is a valve adapted to be operated within the car, controlling the admission of steam to the drum D.

G is a discharge-pipe allowing the water of condensation to escape into the trap K. The trap K is provided with a sediment-chamber V', into which the discharge from the drum enters by means of the pipe G, which connects into the trap through the port $v$. The blow-off pipe $V^2$ is arranged in said chamber V' and controlled by means of the valve $V^3$. Communicating with the chamber V' is a chamber W within the trap K. Between the chamber W and the sediment-chamber V', I arrange a screen or perforated bonnet $v'$ in such a manner that the sediment contained in the water entering the sediment-chamber V' will be prevented from passing into the chamber W. Within the chamber W, I arrange a stem L, adapted to operate against the tension of the spring S on said stem, said stem guided by projecting into the recess X'. On one end of the stem is arranged a disk valve L', preferably provided with a gasket $j'$, adapted to engage with the valve-seat $j$. The lower surface of the disk valve is preferably saucer-shaped to allow for the engagement thereof with the projection $L^2$ on the spider M. In order to provide for guiding the disk valve L', I arrange a series of lugs $j^2$, secured to the fitting containing the valve-seat $j$.

The lower portion of the trap K is provided with a hinged joint R in such a manner that the trap may be opened, and for the purpose of securing it together I arrange a lock R'. By this means the thermostatic cell N may be taken out when desired and the spiders removed and replaced when necessary. In order to insure the adjustment of the thermostatic cell N, I place a bolt $n$ through the bottom of the trap, which bolt engages with the spider O, supporting the thermostatic cell. The bolt $n$ is arranged to mesh with threads in the case of the trap and provided with a nut $n'$ on the outside of the casing. The thermostatic cell is preferably constructed of spring metal, and the spiders M and O are preferably arranged in reference to the thermostatic cell in such a manner that the spiders come in contact with the cell at their centers only. The lower portion of the trap is provided with openings P, allowing for the free circulation of air beneath the spiders holding the thermostatic cell and also for the discharge of water from the trap. The thermostatic cell contains a liquid whose boiling-point is about 180° Fahrenheit, so arranged that when the liquid in the thermostatic cell reaches about 180° Fahrenheit the thermostatic cell will be raised, which will raise the valve L' against the seat $j$. When the liquid in the thermostatic cell is below its expansive point, the spring S on the stem L will open the valve. The trap being in contact with the discharge-pipe G of the steam-drum is in hot metallic connection to such an extent that the water contained in the trap is kept above the freezing-point. At the same time the temperature is so arranged by means of the adjustment of the parts of the trap that the thermostatic cell is not affected to any appreciable extent by the hot metallic connection with the drum.

The operation of my system is simple and apparent. By means of the metallic connection with the drum I prevent any possibility of the trap becoming inoperative because of freezing, since the drum is of course always warm. The discharge from the pipe G is received within the sediment-chamber V' until the water percolates through the screen v' into the overflow-chamber W, where it is discharged and passes out through the openings P in the bottom of the trap. When hot water or steam passes into the overflow-chamber, the thermostatic cell becoming heated causes the valve to close, preventing further discharge from the pipe. When the sediment-basin V' has become filled or it is desired to clean it out or blow off the contents for any reason, the valve V³ is operated, allowing a discharge through the blow-off pipe V². By means of the plug 10, which is arranged to engage with threads in the casting at the side of the sediment basin or chamber, an opening may be obtained into the sediment-chamber through which the bonnet v' may be placed in position or taken out when desired. It will be noticed that the sediment contained in the discharge entering the trap is prevented from coming in contact with the thermostatic cell, it being deposited in the sediment-basin. The trap K being made in a single casting containing both the sediment-chamber and the overflow-chamber, as well as the trap operated by the thermostatic cell, it is apparent that there can be no freezing in the trap operated by the thermostatic cell so long as there is warm water in the sediment-chamber or so long as heat is applied in any manner to the casting.

In this trap I do away with some of the parts described in my application for Letters Patent on car-heating systems, filed January 6, 1898, Serial No. 665,796, and arrange for a more compact device which, as has been said before, is prevented from freezing because of the warmth communicated to the casing from the discharge-pipe of the car-heating system or the contents thereof.

What I claim as my invention, and desire to secure by Letters Patent of the United States, is—

1. A thermostatic trap, consisting of a casing, within which casing are a sediment-chamber, an overflow-chamber, a perforated screen placed in the port connecting said sediment-chamber and said overflow-chamber and a valve in said overflow-chamber operated by means of a thermostatic cell placed in said casing, substantially as described.

2. A thermostatic trap consisting of a casing, said casing containing a sediment-chamber, an overflow-chamber, a screen placed in the port communicating between said sediment-chamber and said overflow-chamber, a spring-actuated valve in said overflow-chamber, a thermostatic cell adapted to close said valve against the tension of said spring, with a blow-off pipe located in said sediment-chamber, substantially as described.

3. In a thermostatic trap, a casing adapted to be connected to a car-heating system, a sediment-chamber in said casing into which the discharge from said car-heating system passes, a screen placed in a port communicating between said sediment-chamber and an overflow-chamber, also located in said casing, a valve in said overflow-chamber, a thermostatic cell adapted to close said valve and a means for opening said sediment-chamber and removing said screen when desired, substantially as described.

4. In a thermostatic trap, adapted to be connected to a railway-car-heating system, a casing containing a sediment-chamber and an overflow-chamber, with a thermostatic cell and a valve adapted to be closed by said thermostatic cell, a drum and metallic connections between said casing and said drum, substantially as described.

Signed by me at Albany, New York, this 6th day of July, 1898.

JAMES F. McELROY.

Witnesses:
W. S. MORRISON,
CHAS. B. MITCHELL.